United States Patent
Leclerc

(12) 
(10) Patent No.: US 6,691,953 B2
(45) Date of Patent: Feb. 17, 2004

(54) EJECTABLE DOOR FOR AIRCRAFT

(75) Inventor: Frédéric Leclerc, Pechbusque (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 10/355,803

(22) Filed: Jan. 30, 2003

(65) Prior Publication Data

US 2003/0141415 A1 Jul. 31, 2003

(30) Foreign Application Priority Data

Jan. 31, 2002 (FR) ............................................. 02 01147

(51) Int. Cl.[7] ................................................ B64C 1/14
(52) U.S. Cl. .......................... 244/129.5; 49/221; 49/40
(58) Field of Search ........................ 244/129.5, 129.4, 244/118.1; 49/221, 226, 279, 40, 103; 74/471 R

(56) References Cited

U.S. PATENT DOCUMENTS

| | | | | |
|---|---|---|---|---|
| 2,797,884 A | * | 7/1957 | Peed | |
| 2,910,255 A | | 10/1959 | Johnson | ...................... 244/129 |
| 3,051,280 A | * | 8/1962 | Bergman et al. | |
| 3,085,297 A | * | 4/1963 | Linderfelt | |
| 3,851,845 A | | 12/1974 | Edwards | ...................... 244/129 |
| 4,180,943 A | * | 1/1980 | Smith et al. | |
| 4,479,622 A | * | 10/1984 | Howse | |
| 4,944,473 A | * | 7/1990 | Kallies et al. | |
| 5,305,969 A | * | 4/1994 | Odell et al. | |
| 5,931,415 A | * | 8/1999 | Lingard et al. | |

FOREIGN PATENT DOCUMENTS

| | | | |
|---|---|---|---|
| EP | 0 876 954 A2 | 11/1998 | ............. B64C/1/14 |
| EP | 0 876 954 A3 | 3/1999 | ............. B64C/1/14 |
| FR | 1229335 | * 9/1960 | ............. 244/129.5 |
| GB | 1291854 | * 10/1972 | ............. 244/129.5 |
| GB | 2 181 780 | 4/1987 | ............. E05F/7/02 |

\* cited by examiner

Primary Examiner—T. Dinh
(74) Attorney, Agent, or Firm—Thelen Reid & Priest, LLP

(57) ABSTRACT

A plug type door intended particularly for use on a military cargo type aircraft is designed to enable its ejection if necessary. To do this, an operating device such as a handle (28) simultaneously controls retraction of hinge pins (16c) from the hinges about which the panel (10) of the door is hinged to its frame (12) and retraction of the mechanical elements (21) against which the stops (19) fitted on the panel usually bear by gravity, when the door is closed. Furthermore, guide ramps connected to the frame (12) and in which the rollers supported by the panel (10) open downwards, to enable the panel (10) to drop by gravity when the handle (28) is pulled.

9 Claims, 3 Drawing Sheets

EJECTABLE DOOR FOR AIRCRAFT

CROSS REFERENCE TO RELATED APPLICATION

This application claims priority of French Patent Application No. 02 01147, filed on Jan. 31, 2002, entitled "Ejectable Door For Aircraft" by Frederic Leclerc and which was not published in English."

TECHNICAL FIELD

The invention relates to an ejectable door designed to facilitate the emergency evacuation of an aircraft if necessary.

More precisely, the invention relates to an articulated "plug" type aircraft door that stops in contact with the mechanical elements fixed to the door frame, when it is in the closed position. In flight, the pressure on the inside of the cabin keeps the door closed, holding it in contact on some of these mechanical elements. The other mechanical elements support the weight of the door.

The invention is particularly applicable to military cargo type aircraft, designed for troop transport or equipment transport.

STATE OF PRIOR ART

Commercial aircraft such as aircraft intended for passenger transport are usually fitted with "plug" type doors. In the case of an aircraft emergency evacuation, the doors are used by passengers as emergency exits when the aircraft is on the ground.

Document GB-A-2 181 780 describes a "plug" type aircraft door in which stops located on the door come into contact with mechanical elements fixed on the door frame, when the door is closed. The door is hinged on the frame by a hinge mounted on its bottom edge so that it opens tilting downwards, and vice versa. Means are provided to engage the stops on the mechanical elements of the frame during closure, and vice versa. When the door is opened, these means displace the door upwards before tilting it downwards.

Unlike a commercial aircraft, it must be possible to evacuate a military cargo type aircraft intended for troop or equipment transport in flight, if necessary depending on circumstances. Therefore in this case, the doors used for embarking have to be removed quickly to allow free passage for evacuation of the crew. It can be understood that a door like that described in document GB-A-2 181 780 cannot solve this problem.

Pyrotechnic means are known that are capable of ejecting the door to enable evacuation of the crew during flight if necessary. Nevertheless, these means create different problems such as maintenance, and risks associated with the presence of explosives and reliability. There is always a risk of failure or accidental triggering of these pyrotechnic means. Another problem is due to the irreversible nature of their triggering.

PRESENTATION OF THE INVENTION

The purpose of the invention is to correct at least some of the disadvantages of "plug" type doors used on aircraft, and particularly military aircraft.

More precisely, the purpose of the invention is to enable fast evacuation in flight or on the ground of an aircraft equipped with "plug" type doors, without any risk and significantly reducing maintenance and reliability problems.

According to the invention, this result is obtained using an aircraft door comprising a frame that can be fixed to the fuselage of the aircraft, a panel articulated onto the frame by articulation means, stops and mechanical elements installed on the panel and on the frame respectively, so as to remain in mutual contact under the effect of the weight of the panel when the door is closed, and guide means inserted between the panel and the frame in order to automatically release/engage the stops with respect to the mechanical elements, at the beginning of opening and at the end of closing of the door respectively, characterized in that it also comprises means of ejection triggering, that can control mechanical disconnection of articulation means and a relative disengagement of the stops from the mechanical elements, the guide means enabling downwards displacement of the panel by gravity when the ejection triggering means are used.

Due to this arrangement, the door panel is automatically released and drops by gravity as soon as the ejection triggering means are actuated. Emergency evacuation of the aircraft is thus made possible without the use of pyrotechnic means with all the disadvantages mentioned above.

According to a preferred embodiment of the invention, the ejection triggering means are mechanical means. Note that as a variant, these ejection triggering means may also be electrical, pneumatic or hydraulic means without going outside the framework of the invention.

Advantageously, the articulation means comprise main hinges provided with pivot hinge pins that can be retracted by use of the said ejection triggering means to control disconnection of the articulation means.

In this case, the ejection triggering means preferably comprise a part mounted on the frame capable of rotating about a given rotation axis and rods connecting the said part to the pivot hinge pins.

Also advantageously, the ejection triggering means are capable of retracting the mechanical elements mentioned above inside the frame to release them from the stops, when the ejection triggering means are used.

Also advantageously, the guide means comprise rollers installed on the panel and guide ramps fixed to the frame, the said ramps being open towards the bottom to enable the panel to move downwards, by gravity, when the ejection triggering means are used.

According to one variant embodiment of the invention, the ejection triggering means also control at least one active mechanical ejector capable of pushing the panel downwards when the ejection triggering means are used.

In this case, the active mechanical ejector is preferably installed on an upper edge of the frame.

According to another variant embodiment of the invention, the articulation means are inserted between the lower edges of the panel and the frame, and at least one passive spring-loaded mechanical ejector is included in the articulation means, capable of pushing the panel downwards during disconnection of the articulation means.

BRIEF DESCRIPTION OF THE DRAWINGS

We will now describe a preferred embodiment of the invention for illustrative purposes only, and in no way limitative, with reference to the attached drawings in which.

DETAILED DESCRIPTION OF A PREFERRED EMBODIMENT OF THE INVENTION

A preferred embodiment of the aircraft door according to the invention is shown in the figures.

Figure 1:
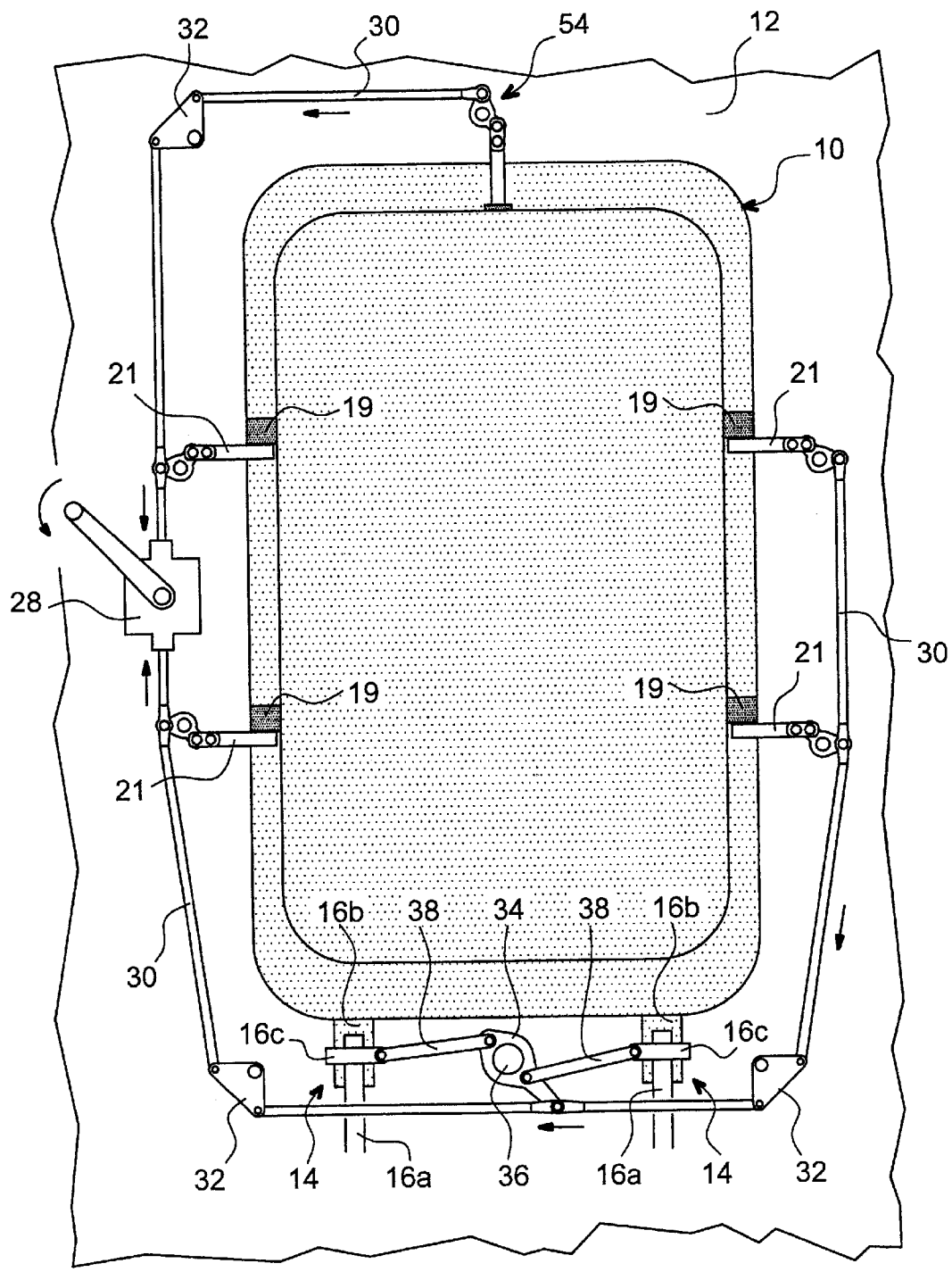
FIG. 1 is a front view that diagrammatically represents an aircraft door according to the invention, observed from inside the aircraft.

As illustrated particularly in FIG. 1, the door comprises a rigid panel 10 and a frame 12 fixed to the aircraft fuselage. As will be explained later, the door is a plug type door.

In the embodiment shown, the door panel 10 is articulated on the frame 12 by articulation means 14 inserted between the lower horizontal edges of the panel and the frame. These articulation means 14 comprise two hinges 16, the structure of which is shown in more detail in FIG. 2.

Each of the hinges 16 comprises a fixed element 16a fixed to the frame 12 and a mobile element 16b articulated on the fixed element 16a by a hinge pin 16c. The two hinge pins 16c are oriented along a common horizontal geometric axis. Each of the mobile elements 16b forms a lever, the ends of which are connected to the lower part of the door panel 10 by two articulated connecting rods 16d and 16e. The connection between the connecting rod 16e and the door panel 10 is made through a rotating part 16f.

The hinges 14 enable the door panel 10 to go downwards and upwards when the open/close control means (not shown) are actuated to open or close the door. These open/close control means, which may for example include jacks, do not form part of the invention. Furthermore, they are known to those skilled in the art. Therefore they will not be described here.

Cooperation of the lever formed by each of the mobile elements 16b of the main hinge 16 with the lower part of the door panel 10, through the connecting rods 16d and 16e, superposes an upwards translation movement onto the pivoting movement of the door panel 10 when the door opens and downwards movement when the door closes.

Figure 2:
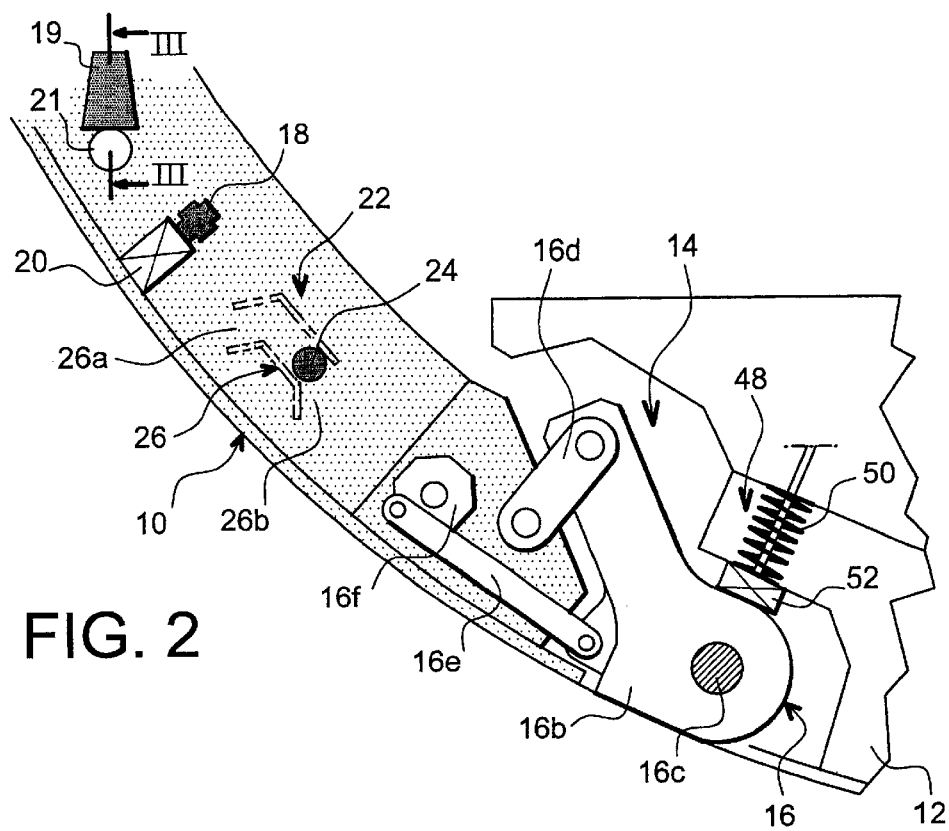
FIG. 2 is a partial sectional side view at a larger scale, that diagrammatically represents the bottom part of the door in FIG. 1.

As illustrated in FIGS. 1 and 2, the first stops 18 are installed on the two vertical parts of the edge of the panel 10. When the door is closed, these stops 18 bear in contact with the first mechanical elements 20 mounted on the frame 12. More precisely, the stops 18 are offset towards the inside of the aircraft from the mechanical elements 20, such that the difference in pressure between the inside and outside of the aircraft tends to force the stops 18 into contact with the mechanical elements 20.

Furthermore, the second stops 19 are also installed on the two vertical parts of the edge of the panel 10. When the door is closed, these stops 19 bear in contact with the second mechanical elements 21 installed on the frame 12, under the effect of the weight of the panel 10. More precisely, the stops 19 are offset upwards from the mechanical elements 21. These second mechanical elements 21 resist the weight of the panel 10 and therefore hold it in place.

The characteristics that have just been described are conform with the characteristics of any plug type door.

Furthermore, guide means 22 are inserted between the panel 10 and the frame 12 of the door, along the vertical edges of the said panel, as shown partially in FIG. 2. These guide means 22 comprise rollers 24 fitted on the edge of the panel 10 and guide ramps 26 formed on the frame 12. The center lines of the rollers are oriented along a horizontal direction approximately parallel to the longitudinal axis of the aircraft. The guide ramps 26 have their upper end 26a open along a horizontal direction towards the outside of the aircraft, such that the rollers 24 penetrate into the said ramps 26 through their upper end and guide the panel so that it is slightly retracted inside the fuselage to close the door.

According to the invention, the door is also equipped with non pyrotechnic means to quickly eject the panel 10 if necessary. In the preferred embodiment of the invention which will now be described, these ejection means are fully mechanical. As a variant, they may comprise different types of ejection triggering means, and particularly electrical, hydraulic or pneumatic.

In the embodiment shown in the figures, the ejection triggering means comprise an operating device such as a handle 28 (FIG. 1) installed on the frame 12 inside the aircraft.

The handle 28 is connected to the hinge pins 16c of the hinges 16 and to the mechanical elements 21 by appropriate mechanism. This mechanism is designed such that actuating the handle 28 in the ejection direction has the effect firstly of moving the pivot hinge pins 16c along their center line such that the fixed elements 16a and mobile elements 16b are mechanically disconnected, and secondly retracting the second mechanical elements 21 inside the frame 12 so as to disengage the said second element from the stops 19.

The guide ramps 26 also have their lower end 26b open towards the bottom, to enable the panel 10 to move downwards by gravity as necessary for ejection of the said panel.

As illustrated in FIG. 1, the mechanism connecting the handle 28 to the hinge pins 16c and to the second mechanical elements 21 comprises a rod that runs along the frame 12, and for which the different segments 30 are connected to each other, in the corners of the said frame, by the pivoting devices 32. Thus, operating the handle 28 has the effect of moving the segments 30 in translation in either direction.

As also shown in FIG. 1, the segment 30 that moves along the lower edge of the frame 12 is fixed on a part 34 installed on the said frame so as to be able to rotate about a rotation axis 36 in a horizontal direction transverse to the direction of the aircraft. Two connecting rods 38 connect the part 34 to each of the pivot hinge pins 16c of the hinges 16. Thus, translation of the lower segment 30 towards the left as shown in FIG. 1, controlled by actuation of the handle 28, has the effect of pivoting the part 34 in the clockwise direction and consequently moving the hinge pins 16c towards the said part 34. The amplitude of this displacement is such that the fixed elements 16a and the mobile elements 16b of the hinges 16 are mechanically disconnected when the handle 28 is brought into its "ejection" position.

Figure 3:
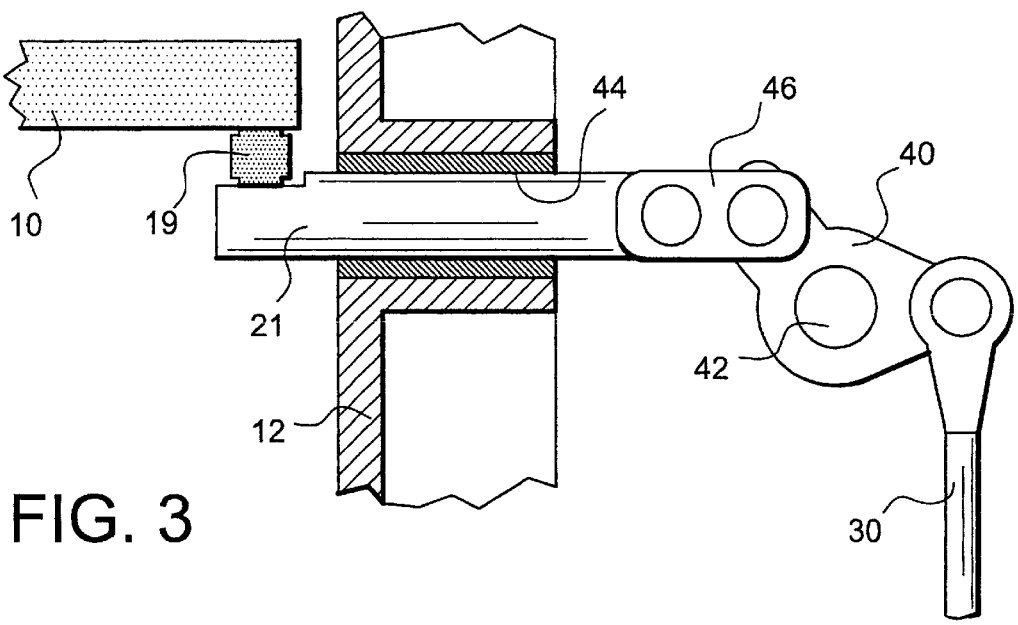
FIG. 3 is a sectional view at a larger scale along line III—III in FIG. 2.

As shown in FIG. 3, the segments 30 located on the vertical parts of the frame 12 are articulated on the crank handles 40 that are installed free to pivot on the said frame by hinge pins 42 installed parallel to the hinge pin 36. The crank handles 40 are installed on the frame 12 facing each of the second mechanical elements 21, and these second mechanical elements 21 are installed free to slide in the reamings 44 formed in the frame 12, along the horizontal directions parallel to the longitudinal center line of the aircraft. Each crank handle 40 is connected to one of the second mechanical elements 21 through an articulated connecting rod 46.

Due to the layout that has just been described, translation of the segments 30 located on the vertical parts of frame 12 caused by actuation of the handle 28, has the effect of displacing the second mechanical elements 21 towards the inside of the reamings 44. More precisely, the mechanical elements 21 are retracted inside the frame 12 when the handle 28 is brought into the "ejection" position. The second stops 19 are then disengaged from the second mechanical elements 21 and the panel 10 of the door is released.

Figure 4:
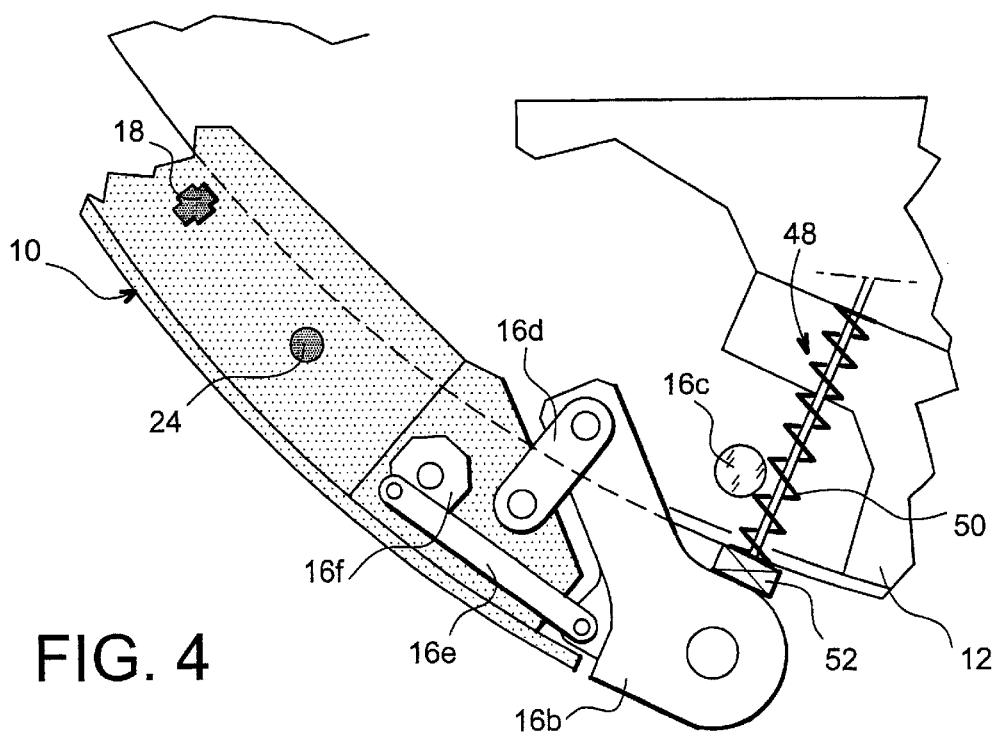
FIG. 4 is a sectional view comparable to FIG. 2, illustrating ejection of the door panel.

As illustrated particularly in FIG. 4, disconnection of the door articulation means and relative disengagement of the second stops 19 and the second mechanical elements 21 have the effect of eliminating all connections between the panel 10 and the frame 12 of the door. Therefore the panel 10 drops by gravity, which is possible due to the fact that the guide ramps 26 are open downwards.

It is possible that excessive bond between the seal placed around the periphery of the door or the presence of frost or ice can hinder the panel from being ejected. Several mechanical ejectors may be provided if necessary to overcome this problem.

Thus, as shown diagrammatically in FIGS. 2 and 4, a passive spring-loaded ejector 48 can be installed on the frame 12 close to each of the hinges 16. This ejector comprises a spring 50 that presses a part 52 into contact with an upper face of the mobile element 16b of the corresponding hinge 16. As soon as the hinge pin 16c is removed from the hinge 16 by using lever 28, the spring-loaded ejector 48 pushes the door panel 10 downwards, thus enabling its ejection.

Figure 5:
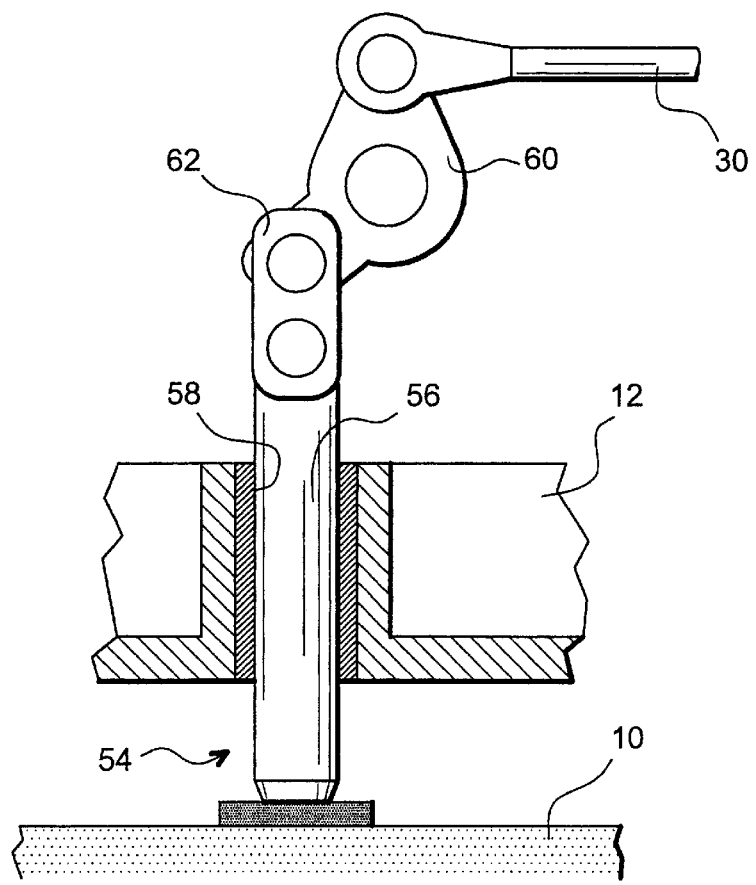
FIG. 5 is a sectional view at a larger scale showing a detail of the door in FIG. 1.

Furthermore, as shown in FIG. 5, one or several active ejectors 54 may also be provided, particularly on the upper part of the door. Each ejector 54 comprises a pusher 56, installed free to slide in a vertical reaming 58 formed in the upper part of the frame 12. The pusher 56 is connected to the segment 30 installed on the upper part of the frame 12 through a crank handle 60 and a connecting rod 62.

What is claimed is:

1. Aircraft door comprising a frame that can be fixed to the fuselage of the aircraft, a panel articulated onto the frame by articulation means, stops and mechanical elements installed on the panel and on the frame respectively, so as to remain in mutual contact under the effect of the weight of the panel when the door is closed, and guide means inserted between the panel and the frame in order to automatically release/engage the stops with respect to the mechanical elements, at the beginning of opening and at the end of closing of the door respectively, in which the said door also comprises ejection triggering means, that can control mechanical disconnection of the articulation means and a relative disengagement of the stops from the mechanical elements, the guide means enabling downwards displacement of the panel by gravity when the ejection triggering means are used.

2. Aircraft door according to claim 1, in which the ejection triggering means are mechanical means.

3. Aircraft door according to claim 1, in which the articulation means comprise hinges (16) provided with hinge pins that are retractable by use of the said ejection triggering means to control disconnection of the articulation means.

4. Aircraft door according to claim 3, in which the ejection triggering means comprise a part installed on the frame so as to be able to rotate around a given rotation axis and rods connecting the said part to the hinge pins.

5. Aircraft door according to claim 1, in which the ejection triggering means are capable of retracting the said mechanical means inside the frame to release them from the stops when the said ejection triggering means are used.

6. Aircraft door according to claim 1, in which the guide means comprise rollers installed on the panel and guide ramps fixed to the frame, the said ramps being open downwards in order to enable the said displacement of the panel downwards by gravity, during use of the ejection triggering means.

7. Aircraft door according to claim 1, in which the ejection triggering means also control at least one active mechanical ejector capable of pushing the panel downwards during use of the ejection triggering means.

8. Aircraft door according to claim 7, in which the said active mechanical ejector is installed on an upper edge of the frame.

9. Aircraft door according to claim 1, in which the articulation means are inserted between the lower edges of the panel and the frame and at least one passive spring-loaded mechanical ejector is integrated into the articulation means, capable of pushing the panel downwards during disconnection of the articulation means.

* * * * *